Jan. 29, 1963 C. A. HENYAN 3,075,454
THERMOMETER SUPPORT FOR ROTISSERIE
Filed Oct. 3, 1958
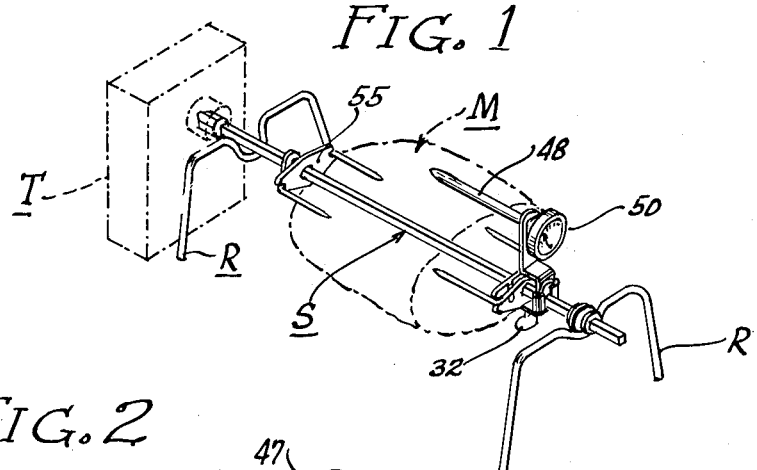
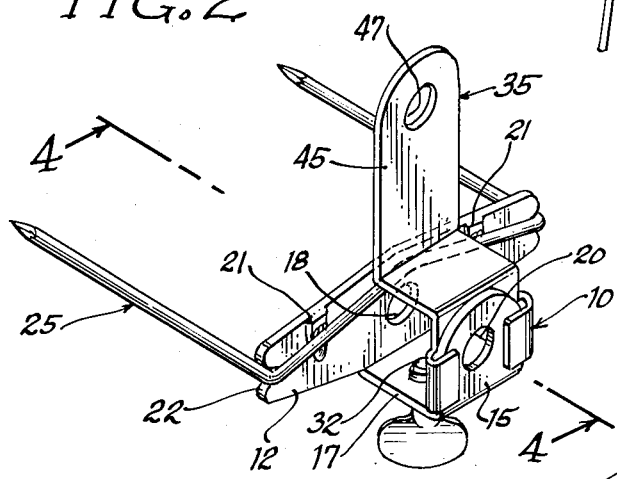
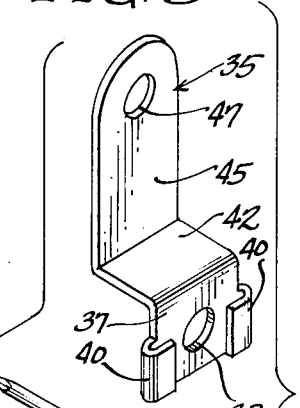
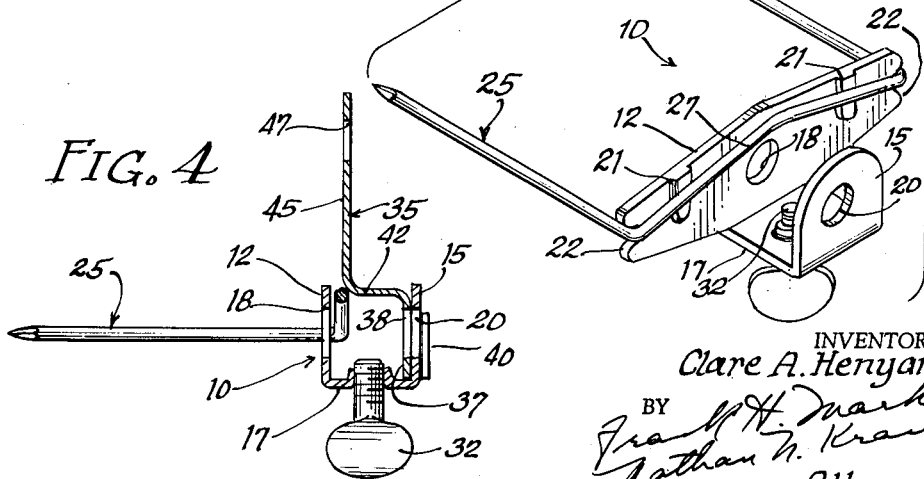
INVENTOR.
Clare A. Henyan
BY
Attorneys

United States Patent Office 3,075,454
Patented Jan. 29, 1963

3,075,454
THERMOMETER SUPPORT FOR ROTISSERIE
Clare A. Henyan, Hebron, Ohio, assignor to Sears, Roebuck and Co., Chicago, Ill., a corporation of New York
Filed Oct. 3, 1958, Ser. No. 765,211
4 Claims. (Cl. 99—421)

My invention relates to a thermometer holder for use in conjunction with a rotisserie, more especially one of the type designed for domestic use, as in a kitchen range.

Mathis Patent No. 2,787,948, granted April 9, 1957, discloses a rotisserie of the general type contemplated by my invention and embodying a thermometer forming part of the meat spit thereof. My invention is designed to overcome certain disadvantages inherent in the design of structures of this type and, more particularly, to provide a more accurate reading of the meat temperature. In a structure as shown in said patent part of the spit is exposed to direct heat radiated from the heating unit, thus tending to give a higher temperature reading than is warranted by the actual meat temperature.

More particularly, an object of my invention is to provide an arrangement and construction whereby a thermometer may be inserted in a body of meat or other food disposed on a rotisserie spit and firmly supported so long as desired and whereby the position of the thermometer in the body of meat may be changed at will or entirely removed therefrom without disturbing the arrangement of the meat on the rotisserie spit.

A further object of my invention is to provide a thermometer support which may be inserted in a body of meat carried by a rotisserie spit which support functions additionally to retain the meat on the spit fixed against rotation or movement longitudinally of the spit.

Still another object is to provide an article of class described which will be simple and inexpensive in construction, convenient and rugged.

Various other objects and advantages will become apparent as the description proceeds.

Referring now to the drawings forming a part of this specification and illustrating a preferred embodiment of my invention, FIG. 1 is a perspective view showing a thermometer support and a meat thermometer carried thereby in operative relation to a body of meat carried by a rotisserie spit of more or less standard design;

FIG. 2 is a perspective view on an enlarged scale of the thermometer support shown in FIG. 1;

FIG. 3 is an exploded perspective view on a still further enlarged scale of two separable parts constituting the thermometer support of this particular embodiment, and FIG. 4 is a longitudinal sectional view of the same taken substantially along line 4—4 of FIG. 2.

In accordance with my invention, I provide a yoke member indicated generally by the numeral 10 which may conveniently be formed of sheet metal. This yoke, as seen best in FIG. 4, is generally U-shaped in cross-section, having a horizontally elongated upstanding leg portion 12, a relatively narrow upstanding leg portion 15 and a web portion 17, connecting said leg portions.

The leg portions 12 and 15 are provided with alined apertures 18 and 20 either round or square, and large enough to receive the rotisserie spits. Leg 12 also has a plurality of embossments 21 which preferably extend toward the leg portion 15. Leg portion 12 is also provided at the ends thereof with notches 22, 22.

A U-shaped fork member 25 embraces and is secured to said leg portion 12 as by welding or brazing the same to the embossments 21, said fork 25 extending within the notches 22 and being slightly bowed in a vertical direction away from the aperture 18, as indicated at 27.

Web portion 17 is pierced and provided with a female thread through which extends a thumb screw 32.

Detachably carried by the yoke member 10 is a bracket member 35 which may likewise conveniently be formed of sheet metal and is of generally Z-shaped formation, having a tongue portion 37 pierced as at 38 (FIG. 3) with an aperture of substantially the same diameter as apertures 18 and 20 and registering with the latter, said tongue portion 37 having integral marginal loop members 40, 40 adapted to embrace leg 15 whereby the bracket 35 may be detachably retained on leg 15 by simple vertical sliding movement.

Bracket 35 is also provided with an upstanding tongue portion 45 provided with an aperture 47 adapted to receive spit portion 48 forming part of a dial thermometer 50. Meat thermometers of this general character are well known in the art, being exemplified by that disclosed in Ford Patent No. 2,276,178 granted March 10, 1942. While a dial type thermometer is especially desirable, other types may be used.

Between tongue portions 37 and 45 is a transverse connecting portion 42.

In use, the fork member 25 with bracket 35 arranged in position is inserted in a body of meat M after the latter has been arranged on the spit S of a rotisserie of any suitable type such as that seen in FIG. 1, spit S being rotatably carried by spaced supports R and actuated by a suitable motor T. Bracket 35 is firmly secured against sliding and rotation on the rotisserie spit S by thumb screw 32. Another fork 55 fixed on the rotisserie spit in spaced relation to fork 25 and in non-sliding and non-rotatable relation to said spit cooperates on the opposite side of the meat body M with the fork 25 to hold the meat non-rotatably on the rotisserie spit. Bracket 35 is retained by spit S passing through aperture 38 of the bracket against dislocation from yoke 10.

After the meat body is thus firmly secured with bracket 35 arranged on arm 15 of yoke 10 in the position shown in FIGS. 1 and 2, the stem 48 of the thermometer is then passed through the aperture 47 until it is substantially buried within the meat and the latter is then ready to be cooked.

It will be seen that in accordance with my invention numerous advantages are attained. Although the thermometer might be inserted in the meat independently of its support at any desired point, there would be a likelihood of its subsequent dislocation and falling out of the meat as a result of the chemical and physical changes which the meat undergoes in the course of the cooking. By means of my improved support the thermometer is retained in proper position in the body of the meat throughout the entire course of the cooking operation and is always readily accessible to view.

Another important advantage accruing to my invention is that substantially the entire stem of the thermometer may be retained within the body of meat throughout the entire length of the cooking operation, whereby the thermometer dial will at all times accurately register the actual temperature of the meat and thus facilitate proper cooking. In contradistinction, where a portion of the thermometer body remains outside of the food and receives heat directly from the heating elements, the thermometer will not accurately indicate the temperature of the food but will show a higher and misleading temperature, resulting in improper cooking.

The thermometer support, being slideable on the spit S, may be adjusted to a roast of any size.

The simplicity of construction and separability of parts inherent in my invention also make for ease of handling and of thorough cleansing.

Various changes coming within the spirit of my invention will readily suggest themselves to those skilled in the art. Hence, I do not wish to be limited to the specific form shown or uses mentioned herein except to the extent indicated by the appended claims.

I claim:

1. In an article of the class described, a member apertured to receive a rotisserie spit for rotation therewith and longitudinally slideable thereon, a fork portion carried by said member for engagement in a body of food carried by the spit, means for securing said member in adjusted position on the spit, and a thermometer support detachably carried by said member and apertured to receive said spit, the apertures of the member and thermometer support being in registry when said parts are in assembled relation, means on one of the member and thermometer support and engaging the other for preventing movement of said thermometer support relative to said member in a direction parallel to the axis of said apertures, said thermometer support having a passage for removably retaining a thermometer stem a portion of which is disposed in said food body.

2. A combination as in claim 1, wherein said member and thermometer support each comprises a sheet material portion and said movement preventing means comprises a pair of opposed channels on one of said member and said support and slideably engageable with the other.

3. A combination as in claim 1, and a thermometer detachably disposed in the passage of said support, said thermometer including a stem portion normally disposed in part in a body of food carried on the spit and a dial portion normally readable with the stem portion so disposed in the food.

4. A combination as in claim 1, wherein said member is of U-shaped sheet material having a pair of aligned apertures to receive the spit and also having means for fixing said member in longitudinally adjusted position on said spit, and one of said member and thermometer support having a pair of laterally opposed channels for slideably engaging the other, said thermometer support having an aperture registrable with the apertures of said member for receiving the spit and another aperture spaced therefrom for receiving the stem of a thermometer when a portion of said stem is disposed in a body of food carried by the spit.

References Cited in the file of this patent

UNITED STATES PATENTS

| | | |
|---|---|---|
| 70,984 | Fisher | Nov. 19, 1867 |
| 661,645 | Rogers | Nov. 13, 1900 |
| 782,433 | Ashley | Feb. 14, 1905 |
| 1,747,325 | Schey | Feb. 18, 1930 |
| 2,276,178 | Ford | Mar. 10, 1942 |
| 2,388,831 | Cramer | Nov. 13, 1945 |
| 2,505,976 | Leon | May 2, 1950 |
| 2,787,948 | Mathis | Apr. 9, 1957 |
| 2,849,948 | Rowley | Sept. 2, 1958 |